3,206,361
STABILIZED METHYLAMINOACETOCATECHOL HEMOSTATIC WOUND DRESSING
Thomas H. Shelley, East Brunswick, and Shirley A. De Ragon, Plainfield, N.J., assignors to Johnson & Johnson, a corporation of New Jersey
No Drawing. Filed June 19, 1962, Ser. No. 203,449
9 Claims. (Cl. 167—84)

It has been found that methylaminoacetocatechol hydrochloride is an excellent hemostatic material for stopping the bleeding of body wounds and is particularly suitable for the treatment of gauze, absorbent papers, and the like for making hemostatic dressings or other hemostatic wound covers.

As hemostatic dressings or other hemostatic wound coverings are placed in direct contact with open wounds, it is highly desirable that such wound coverings be sterile. However, when attempts are made to sterilize gauze, for example, that has been impregnated with a solution of methylaminoacetocatechol hydrochloride, on sterilization, such as with carboxide sterilization, formaldehyde sterilization, or steam sterilization, substantial discoloration of the so-treated gauze occurs. The treated gauze on sterilizing turns to a dirty brownish color which is most unattractive, and particularly so for the treatment of open wounds. A much more objectionable effect of the sterilization, however, is the substantial loss in the activity of the methylaminoacetocatechol hydrochloride as an effective hemostatic agent. Loss in activity is as high as 70 to 80 percent with carboxide sterilization, this being detectable by chemical assay and by tests for hemostatic activity on animals.

Even without sterilization, the gauze impregnated with the methylaminoacetocatechol hydrochloride is found to discolor on extended periods of standing after treatment, thus giving an unsightly product where the material is packaged and then later opened for use. This discoloration will occur with normal shelf life that is experienced in merchandising such materials.

It has now been discovered that this discoloration on sterilizing and/or aging of gauze and similar material impregnated with methylaminoacetocatechol hydrochloride can be substantially eliminated if the treating solution also contains citric acid and trisodium citrate so that these materials are deposited in the gauze together with the methylaminoacetocatechol hydrochloride.

Not only does the presence of the citric acid and trisodium citrate together with the methylaminoacetocatechol hydrochloride substantially prevent discoloration, but deterioration of the effectiveness of the methylaminoacetocatechol hydrochloride as a hemostatic agent is also substantially inhibited by the inclusion of the citric acid and trisodium citrate. Compositions so prepared show a loss of less than 10 percent of the effectiveness of the methylaminoacetocatechol hydrochloride after carboxide sterilization. This is a substantial improvement over the loss in activity of 70 to 80 percent observed without the presence of the citric acid and the trisodium citrate.

Although it might be considered that the citric acid and the trisodium citrate are used as buffering agents in stabilizing the methylaminoacetocatechol hydrochloride when other conventional buffering agents, such as sodium acetate-acetic acid and boric acid, are tried, similar results are not obtained.

Although in the preferred compositions, the methylaminoacetocatechol hydrochloride is used, the citrate salt of the methylaminoacetocatechol may be used if desired in place of the hydrochloride.

The invention has been mainly described with respect to the treatment of gauze in making hemostatic wound covers. The invention, however, is not limited to the use of gauze for this purpose and any absorbent base material may be used that is otherwise suitable for covering open wounds. Thus, for example, as the base material treated with the composition of the present invention, one may use other fabrics, both woven and nonwoven, absorbent papers, and even absorbent synthetic foams of the type found suitable for use with wounds. In the preferred practice of the invention, however, the base material whether fabric or paper is formed of cellulosic fibers.

The invention is particularly applicable to the treatment of small wounds, such as those treated with adhesive bandages and those that occur in shaving where the person shaving may nick himself as to cause slight bleeding. For shaving nicks and the like, absorbent papers treated with the methylaminoacetocatechol hydrochloride, citric acid, trisodium citrate composition are highly suitable since small pieces of absorbent paper thus treated can be placed over the small cut to stop the bleeding. The paper then can be readily removed.

Where the invention is used in a dressing having a facing backed by other absorbent materials, such, for example, as might occur in the absorbent pad in an adhesive bandage, it is not necessary to impregnate the whole absorbent pad with the hemostatic composition. Only the surface fabric that comes in actual contact with the wound may be so treated if desired. Thus, with an adhesive bandage the absorbent pad might consist of a layer of gauze over other absorbent material with an adhesive tab extending to each side of the absorbent pad. With such a structure it would be necessary only to treat the facing gauze with the hemostatic composition, since the facing gauze is all that would come in contact with the wound where it is desired to stop the bleeding.

In practicing the present invention, the absorbent base to be treated is impregnated with a solution of the methylaminoacetocatechol hydrochloride, citric acid, and trisodium citrate in concentration such as to leave in the dried base about 0.3 to 10.3 parts by weight citric acid and 0.6 to 20.3 parts by weight trisodium citrate for each part by weight methylaminoacetocatechol hydrochloride present. The dried base itself should preferably contain, for example where it is a gauze fabric, 1 to 1.5 percent by weight of the methylaminoacetocatechol hydrochloride. The treatment is preferably made from a water solution, the solution generally containing about 0.5 to 3.0 percent by weight methylaminoacetocatechol hydrochloride, 0.86 to 5.16 percent by weight citric acid, and 1.76 to 10.32 by weight of trisodium citrate. In some instances it is found desirable to include a small amount of F.D. & C. Red No. 4 Dye. Where the dye is added it is generally added in amounts of 0.002 to 0.015 percent by weight of the treating solution. The F.D. & C. Red No. 4 Dye, a disodium salt of 2-(5-sulfo-2,4-xylyl-azo)-1-naphthol-4-sulfonic acid, is also known in the trade as Pleenceau S-X.

The absorbent base material thus treated is then dried. The material, for example treated gauze, may be used as such as the dressing or wound cover either in the form of a gauze pad or, for example, a bandage wrap. In such case, the gauze, after impregnation and drying, is packaged and then sterilized through the package wrap, so as to keep the gauze in a sterile condition until the package is opened just prior to use.

However, where the gauze or other absorbent base material which has been treated with the hemostatic composition is to be used as a part of a dressing, the composite dressing would first be prepared, such as were making an adhesive bandage, and the finished article then packaged and sterilized. Where the dressings are sterilized just prior to use, as where used by hospitals having their own sterilizing equipment, the dressings may be prepared and packaged without sterilizing. However, regardless of when the sterilization takes place, absorbent base materials treated with the hemostatic composition of the present invention are substantially more effective insofar as the prevention of bleeding than are materials treated with the methylaminoacetocatechol hydrochloride alone. Also, the substantial darkening of the dressing or wound cover is avoided.

The following examples further illustrate the preparation of hemostatic dressings of the present invention. The examples are given for the purpose of illustration only and the invention is not limited thereto. A 44 x 36 count gauze is impregnated with a solution containing the following on a weight basis:

| | |
|---|---|
| Stryphnon (methylaminoacetocatechol hydrochloride) | 1.5 |
| Citric acid $H_2O$ | 2.58 |
| Trisodium citrate $\cdot 2H_2O$ | 1.29 |

Distilled water to 100.00.

The impregnation is carried out on a conventional coater at 35 feet per minute to give a solution pick-up of about 120 per cent of the original gauze weight. The impregnated gauze is then dried at a drying temperature of about 250° F. The impregnated dried gauze is then used as a cover of an adhesive bandage pad, the adhesive bandage with pad being sterilized by ethylene oxide sterilization for 30 minutes at 158° to 165° F. After aging at 120° F. for one year, the bandages show excellent hemostatic activity and color stability.

Using the following solution, gauze is treated in a manner similar to the above to give a hemostatic gauze dressing:

| | Percent |
|---|---|
| Stryphnon | 1.00 |
| Citric acid $\cdot H_2O$ | 1.72 |
| Trisodium citrate $\cdot 2H_2O$ | 3.44 |
| F.D. & C. Red No. 4 Dye | 0.005 |

Water to 100%.

The gauze dressing so treated is ethylene oxide sterilized in the manner described in the preceding example. Even after extended aging the dressing is found to have a high degree of hemostatic activity and be substantially free from darkening.

Having thus described our invention, we claim:

1. A protective wound cover comprising an absorbent base containing as a hemostatic agent methylaminoacetocatechol stabilized with citric acid and trisodium citrate.

2. A protective hemostatic wound cover containing an absorbent base impregnated with a composition comprising methylaminoacetocatechol hydrochloride, citric acid, and trisodium citrate, said citric acid and trisodium citrate being present in said composition in amounts of 0.3 to 10.3 parts by weight citric acid and 0.6 to 20.3 parts by weight trisodium citrate per part by weight methylaminoacetocatechol hydrochloride.

3. A protective wound cover of claim 2 in which said absorbent base is formed of cellulosic fibers.

4. A protective wound cover of claim 3 in which said absorbent base is a woven cotton fabric.

5. A protective wound cover of claim 4 in which said absorbent base is a nonwoven fiber sheet.

6. A protective wound cover of claim 5 in which said nonwoven fiber sheet is a nonwoven fabric.

7. A protective wound cover of claim 5 in which said nonwoven fiber sheet is an absorbent paper.

8. A protective hemostatic wound cover containing an absorbent base impregnated with a composition comprising 0.5 to 3 parts by weight methylaminoacetocatechol chloride, 0.86 to 5.16 parts by weight citric acid, 1.72 to 10.32 parts by weight trisodium citrate, and 0.002 to 0.015 part by weight of a disodium salt of 2-(sulfo-2,4-xylyl-azo)-1-naphthol-4-sulfonic acid.

9. An adhesive bandage containing an absorbent pad having at least its wound contacting surface impregnated with a composition comprising methylaminoacetocatechol hydrochloride, citric acid, and trisodium citrate, said citric acid and trisodium citrate being present in said composition in amounts of 0.3 to 10.3 parts by weight citric acid and 0.6 to 20.3 parts by weight trisodium citrate per part by weight methylaminoacetoactechol hydrochloride.

References Cited by the Examiner

Yendt: Survey of Anesthesiology, vol. 1, No. 5, October 1957, p. 481.

LEWIS GOTTS, *Primary Examiner.*

MORRIS O. WOLK, *Examiner.*

UNITED STATES PATENT OFFICE
CERTIFICATE OF CORRECTION

Patent No. 3,206,361　　　　　　　　　　　　　　　September 14, 1965

Thomas H. Shelley et al.

It is hereby certified that error appears in the above numbered patent requiring correction and that the said Letters Patent should read as corrected below.

Column 2, line 55, for "Pleenceau S-X" read -- Ponceau SX --; column 4, lines 29 and 30, for "2-(sulfo-2,4-xylyl-azo)-" read -- 2-(5-sulfo-2,4-xylyl-azo)- --.

Signed and sealed this 7th day of June 1966.

(SEAL)
Attest:

ERNEST W. SWIDER
Attesting Officer

EDWARD J. BRENNER
Commissioner of Patents